United States Patent
Walden et al.

[11] Patent Number: 6,089,825
[45] Date of Patent: Jul. 18, 2000

[54] ABRADABLE SEAL HAVING IMPROVED PROPERTIES AND METHOD OF PRODUCING SEAL

[75] Inventors: Frederick Clell Walden, Jensen Beach; George Lee Crawford, Palm Beach Gardens; William John Dalzell, Jr., Jupiter, all of Fla.

[73] Assignee: United Technologies Corporation, Hartford, Conn.

[21] Appl. No.: 09/215,480

[22] Filed: Dec. 18, 1998

[51] Int. Cl.[7] .................................................. F01D 11/12
[52] U.S. Cl. .................................. 415/173.4; 415/174.4; 428/553; 428/652; 428/654; 428/937
[58] Field of Search ................................ 415/173.4, 173.5, 415/174.4, 174.5; 277/9, 415; 427/447, 452, 456; 428/654, 652, 553, 937; 29/888.3, 527.1, 527.2, 527.4

[56] References Cited

U.S. PATENT DOCUMENTS

| | | | |
|---|---|---|---|
| 4,696,855 | 9/1987 | Petit, Jr. et al. | 428/312.8 |
| 4,936,745 | 6/1990 | Vine et al. | 415/173.4 |
| 5,536,022 | 7/1996 | Sileo et al. | 277/235 A |
| 5,705,231 | 1/1998 | Nissley et al. | 427/453 |
| 5,780,116 | 7/1998 | Sileo et al. | 415/173 |

*Primary Examiner*—Edward K. Look
*Assistant Examiner*—Liam McDowell
*Attorney, Agent, or Firm*—F. Tyler Morrison

[57] ABSTRACT

An air seal for use in a gas turbine engine includes reduced susceptibility to deflagration during operating conditions in which an excessive amount of seal material is liberated from the seal and ingested into the engine. The seal includes a seal substrate, and a thermally sprayed metallic bond layer applied to the seal substrate. The bond layer includes nickel and aluminum. The seal also includes a thermally sprayed abradable seal layer applied to the bond layer. The abradable material is composed of aluminum powder and silicon powder forming a metal matrix, and co-deposited methyl methacrylate particles embedded as filler in the metal matrix. The filler is less likely to deflagrate compared to conventionally used materials such as polyester.

27 Claims, 2 Drawing Sheets

ABRADABLE SEAL HAVING IMPROVED PROPERTIES AND METHOD OF PRODUCING SEAL

BACKGROUND OF THE INVENTION

The present invention relates generally to air seals for gas turbine engines, and relates more particularly to seals having improved properties in operating conditions during which unusually large amounts of seal material is liberated and ingested into the engine.

Gas turbine engines are well known sources of power, e.g., motive power for aircraft or as power generators, and generally include compressor (typically preceded by one or more fan stages), combustor and turbine sections. As illustrated generally in FIG. 1, compressor and turbine sections (and any fan stages) each include shaft-mounted, rotating disks 1, each carrying a set of blades 2 located within a hollow housing or case 3, with intervening sets of stationary vanes 5 mounted to the case. Air seals 4, 7 are provided between the tips of the blades and the case (outer air seals), and between the free ends 6 of the vanes and the knife edges 8 of the disks (knife edge seals) to prevent air leakage between those components.

Air is ingested through an engine inlet and compressed by rotating disks and associated blades in the compressor. The compressed air is then burned with fuel in the combustor to generate high pressure and temperature gasses, which cause rotation of the turbine sections and associated fan compressor stages and are then ejected out an engine exhaust to provide thrust. The case is intended to prevent leakage of air or combustion products around the tips of the blades, i.e., between the blade tips and the case, which leakage reduces the efficiency of the engine.

Despite the design of components to minimize leakage, a substantial proportion of any leakage which does occur in a normally-operating gas turbine engine occurs between the tips of the blades and the case, and between the tips of the vanes and the disks. One manner of eliminating such leakage is to fabricate all mating parts to extremely close tolerances, which becomes increasingly expensive as tolerances are reduced. Moreover, given the temperature ranges to which the parts are subjected to before, during and after operation, and the resultant thermal expansion and contraction of the parts, such close tolerances will at times result in interference between mating parts and corresponding component wear and other damage. Accordingly, gas turbine engine designers have devoted significant effort to developing effective air seals, and particularly seals composed of abradable materials. See, e.g., U.S. Pat. Nos. 4,936,745 to Vine et al. and 5,705,231 to Nissley et al., which are assigned to the assignee of the present invention and expressly incorporated by reference herein. Such seals require a balance of several properties including abradability upon being contacted by a rotating blade tip, erosion resistance, durability, thermal expansion balanced with that of the underlying material, and relative ease and reasonable cost of manufacture. See, e.g., U.S. Pat. No. 5,536,022 to Sileo, which is also assigned to the assignee of the present invention and expressly incorporated by reference herein.

A typical compressor air seal includes the seal substrate, e.g., a metal substrate, a metal layer composed of a metal powder plasma sprayed on the substrate, and an abradable, sealing layer which is also typically plasma sprayed onto the metal layer. A typical sealing layer includes a metal matrix of aluminum and silicon with some amount of embedded polyester powder particles.

During normal operation, small amounts of seal material are removed from the seal by the cooperating part, e.g., a rotating compressor blade tip. However, during engine operation, e.g., a bird strike or a stall or other condition, significant amounts of seal material are liberated by the rotating blades and is ingested into the engine, thus increasing the concentration of metallic and filler material (such as polyester) particles in the ingested air. In addition, the blades rub against the seal with more force than normal and also generate a significant amount of heat over and above the heat due to compression of the air being compressed as it is moved through the engine (and also sometimes produces sparks). In some instances, the significantly higher concentration of polyester ingested into the engine coupled with the heat or sparks leads to deflagration in the engine, and significant damage to or destruction of the engine. While the metal particles can also ignite, the filler materials typically require less energy to ignite and thus ignite before the metal. Such damage can cost millions of dollars in engine damage alone and also poses a safety hazard to persons in proximity to the engine, e.g., passengers on a plane or workers in a power generating plant. While these conditions are not encountered frequently, the design of gas turbine engines should provide for encountering such conditions during engine testing and/or operation, and accordingly must be addressed or resulting serious engine damage or other injuries must be taken for granted.

One proposed solution to the problem has been to heat treat the seal after the materials are deposited by plasma spraying, e.g., to remove the polyester or other filler material from the seal. The polyester (or other filler) provides spacing for the metal matrix, and also absorbs some of the heat generated during rubbing of the seal and the cooperating component. For lightweight seal systems, such as aluminum or similar metal matrix, the removal of the polyester prevents deflagration due to the presence of polyester. However, the metal matrix (of Al and Si) can be damaged during filler removal, e.g., due to the expansion of the filler as it is heated and prior to vaporization and by the heat required to remove the filler. The resulting seal is structurally weak (due to significant porosity), exhibits relatively poor erosion resistance, and is susceptible to significant densification and corresponding poor abradability and sealing. Abradability and erosion resistance are important characteristics for seal materials, and accordingly the proposed solution for this seal material renders the material not appropriate for use in its intended purpose.

Another proposed solution was to apply a seal material utilizing a different filler. The material selected is sold commercially by Sulzer Metco under the designation Metco 320, and is composed of aluminum and silicon powder particles, with hexagonal boron nitride powder particles bound to the aluminum and silicon using an organic adhesive. Such material is also referred to as a "composited powder". This composited powder was delivered as a single source of material to a plasma spray gun and was applied to a seal substrate. During testing, the seal material lacked sufficient amounts of filler material and thus lacked sufficient abradability, and we determined that this condition was due to an inability to bind a sufficient amount of filler to the metal particles. Efforts to increase the amount of filler particles adhered to the metal proved unsuccessful, even after filler particles were adhered to substantially the entire surfaces of the metal particles. Moreover, the adhesive did not vaporize during the plasma spray process and was deposited with the powder materials, and merely added weight without favorably affecting either durability or abradability. During use, this seal material tended to densify and lose its abradability, thus detrimentally affecting seal performance.

It is an object of the present invention to provide a gas turbine engine air seal that provides acceptable durability and abradability and yet will not deflagrate in the event that unusually large amounts of the seal material are ingested into the engine, e.g., during off-design operation.

It is another object to provide such a seal that is also cost effective.

It is yet another object to provide a seal that weighs no more than conventional seal material, and provides no weight penalty.

It is still another object to provide such a seal using conventional equipment.

It is a still further object to provide a process of providing such a seal that enables adjustment of the proportion of metal and of filler, to provide an optimal seal adapted for different operating conditions.

SUMMARY OF THE INVENTION

According to one aspect of the invention, an air seal is disclosed for use in a gas turbine engine, and has reduced susceptibility to deflagration during operating conditions in which an excessive amount (i.e., an amount greater than would be liberated during normal use) of seal material is liberated from the seal and ingested by the engine. The seal includes a seal substrate, and a thermally sprayed metallic bond coat layer applied to at least a portion of the seal substrate. The bond coat preferably includes thermally sprayed nickel and aluminum, and up to 1 weight percent each of iron, copper, zinc, manganese and magnesium. The seal also includes an abradable seal layer applied to the bond coat. The seal layer is a thermally sprayed aluminum powder and silicon powder forming a metal matrix, and a co-deposited polymer such as methyl methacrylate filler particles embedded in the metal matrix. The filler particles have reduced ignitability relative to conventional polyester particles when an unusually large amount of seal material is liberated from the seal, e.g., a bird strike or stall.

According to another aspect of the invention, a method is disclosed for producing an air seal including a seal substrate for a gas turbine engine. The seal material is intended to be less likely to ignite under extreme operating conditions, during which significant amounts of seal material is liberated from the seal and ingested into the engine. The method includes the steps of: providing a source of metal material for incorporation into a metal layer of the seal, the metal material including of nickel and aluminum, and up to 1 weight percent each of iron, copper, zinc, manganese and magnesium; providing a source of filler material, the filler material comprising methyl methacrylate powder; introducing the metal material into a thermal spray and separately introducing the filler material into the thermal spray downstream of the metal material so as to co-deposit the metal material and the filler material to form a seal layer on a substrate, the seal layer composed of a matrix of aluminum and silicon with embedded methyl methacrylate particles. As noted above, seal material liberated from the seal during off-design engine operating conditions will not deflagrate in the engine.

An advantage of the present invention is that the seal provides both acceptable levels durability and abradability, and also will not deflagrate during off-design engine operation (but typically within the flight envelope) during which significant amounts of seal material is ingested into the engine. In addition, the seal of the present invention is cost effective, and does not weigh any more than conventional seal materials. The seal of the present invention can be applied using conventional plasma spray apparatus, and the process of providing such a seal that enables adjustment of the proportion of metal and of filler, to provide an optimal seal adapted for different operating conditions. The seal of the present invention also provides superior erosion resistance compared to conventional seals, such as the Al-Si and polyester seal described above, without significant blade wear penalty.

Additional advantages will become apparent to those skilled in the at in light of the following description and accompanying drawings.

DETAILED DESCRIPTION OF THE PREFERRED EMBODIMENTS

Figure 1:
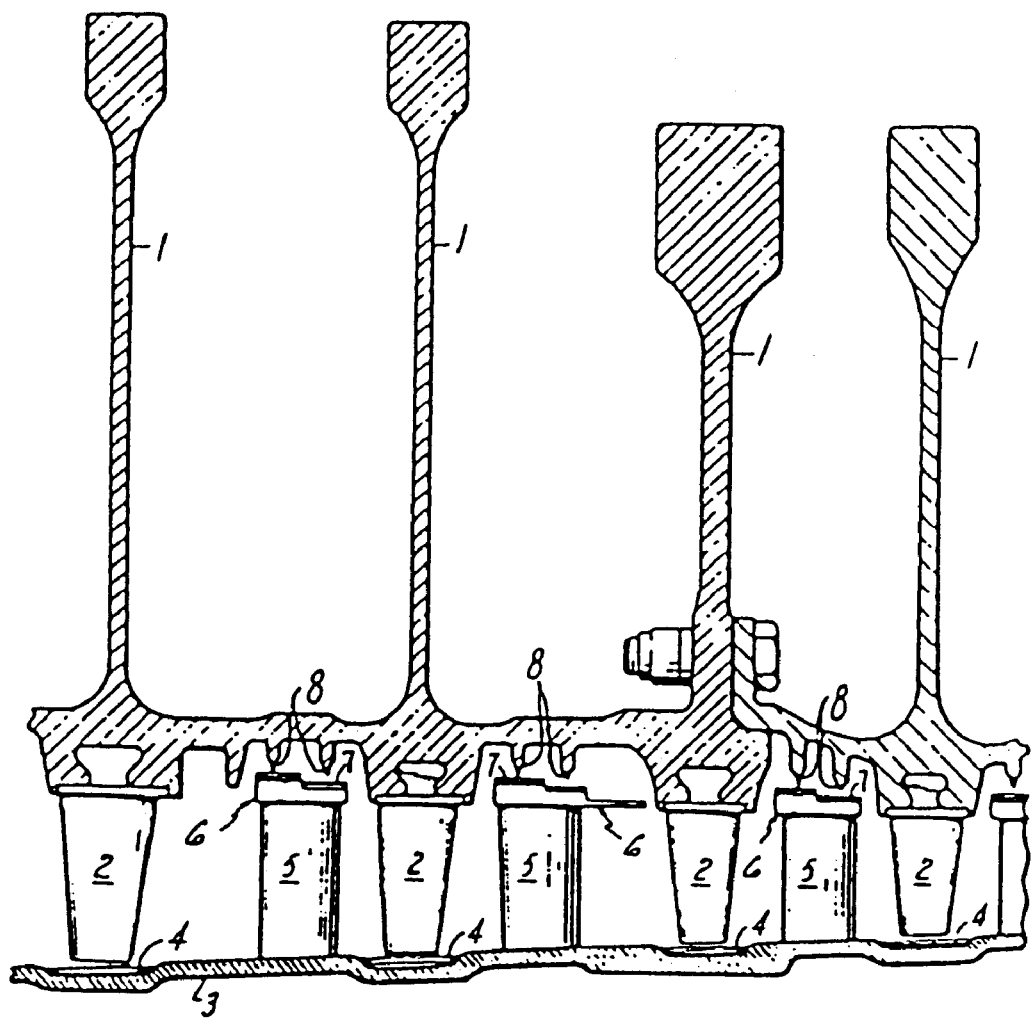
FIG. 1 is a cross sectional view of a portion of a typical gas turbine engine.
Figure 2:
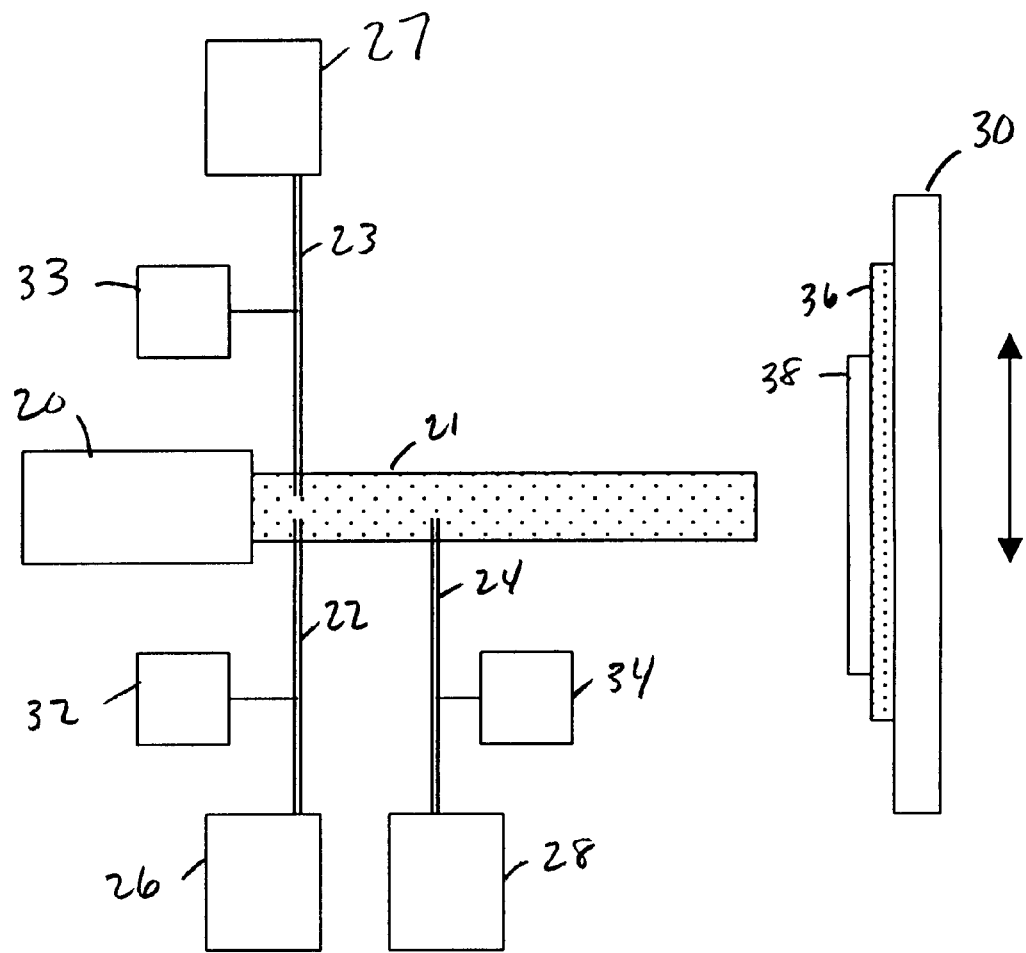
FIG. 2 is a schematic view of a plasma torch for producing the seal in accordance with the present invention.

Turning now to FIG. 2, a plasma spray apparatus includes a torch 20 (including a power source and spray head, neither shown separately from the apparatus generally), and at least three powder delivery lines 22, 23, 24. The torch preferably is capable of simultaneously delivering and spraying at least two separate powders into a flame 21, see, e.g., commonly-owned U.S. Pat. No. 4,696,855 to Pettit, Jr. et al, which is expressly incorporated by reference herein. The lines 22, 23, 24 are coupled respectively to powder material hoppers 26, 27, 28 which contain the powder to be deposited onto a substrate 30, and respective sources 32, 33, 34 of carrier gas such as argon, which deliver the powder from the hoppers into the plasma torch plume. Typical substrate materials include titanium alloys, as well as nickel base, cobalt base and iron base superalloys and combination of these materials, although the present invention is not intended to be limited to such materials. Plasma spray apparatus generally are known in the art, and accordingly have not been described in detail herein. We have used a model 3 MB manufactured by Sulzer-Metco to produce seals in accordance with the present invention. While present invention is described in connection with an outer air seal, it may be equally applied to a knife edge seal (e.g., FIG. 1 at 7, 8), or other suitable application.

The preferred powder for providing a metal bond layer 36 on the substrate 30 is a blend of aluminum and nickel powder. The powder is sold under different names, such as 450-NS or AMDRY 956 from Sulzer-Metco in Westbury, N.Y. The powder is typically a composited powder (particles of one being bound to the other) composed, in weight percent of between about 3.5–6 (preferably between 4–5.5) aluminum, up to about 3 (preferably less than 2.5) organic binder, balance nickel. The powder may also include other materials, such as up to about 19 wt. % chromium in place of some of the aluminum. An alternate metal powder has a nominal composition, by weight, of about 69.5 nickel, 18.5 chromium and about 6 aluminum. Preferably, the powder particles almost completely all (at least about 98% and more preferably at least 99.5% of the particles by weight) pass through a 140 mesh screen; substantially all (at least about 92% and more preferably at least 95% by weight) pass through a 170 mesh screen; and most all (at least about 87% and more preferably at least about 90% by weight) are retained on a 325 mesh screen.

As previously noted, the powder which forms the metal layer 36 is stored in a hopper 26, and a carrier gas such as argon or nitrogen is provided from a source 32, to carry the powder through a line 22, to introduce the powder to the torch 20 as a single source. Preferably a combination of argon and hydrogen is used as the arc gas for the torch. The powder is deposited on the substrate to form a layer 36 of a thickness (preferably uniform) of between about 0.002–0.007 inch, more preferably between about 0.003–0.006 inch.

The preferred powder for providing an abradable layer 38 is a combination of aluminumsilicon alloy powder, and methyl methacrylate powder. The aluminum-silicon powder is sold under different names, such as 52C-NS by Sulzer-Metco. The powder is typically a blended powder (particles of one interspersed with the other) composed, in weight percent of between about 10–14 (preferably between 11–13) silicon, balance generally aluminum and small amounts of other elements including up to about 0.8 iron, up to about 0.3 copper, up to about 0.2 zinc, up to about 0.15 manganese, up to about 0.1 magnesium, and traces of impurities. Preferably, the powder particles almost completely all (at least about 98% and more preferably at least 99% of the particles by weight) pass through a 140 mesh screen; substantially all (at least about 92% and more preferably at least about 93% by weight) pass through a 170 mesh screen; and most all (at least about 87% and more preferably at least about 90% by weight) are retained on a 325 mesh screen.

The methyl methacrylate powder is sold by ICI Acrylics of Wilmington, DE grade 4F or 6751. Preferably, the powder particles substantially all (at least about 90% by weight) pass through a 125 mesh screen; most (at least about 65% by weight) pass through a 63 mesh screen.

The powder which forms an abradable layer 38 is preferably co-deposited, e.g., introduced separately into the plasma. Co-depositing enables the relative amounts of aluminum-silicon powder and methyl methacrylate powder to be adjusted as desired. Preferably a combination of argon and hydrogen is used as the arc gas.

The aluminum-silicon powder is stored in a hopper 27, and a carrier gas such as argon or nitrogen is provided from a source such as the source 33, to carry the powder through a line such as line 23, to introduce the powder to the torch 20. The methyl methacrylate powder is stored in a hopper 28, and a carrier gas such as argon or nitrogen is provided from a source such as the source 34, to carry the powder through a line such as line 24, to introduce the powder into the spray stream produced by the torch 20 downstream of the aluminum-silicon powder. The aluminum-silicon and methyl methacrylate is deposited on the substrate to form the abradable layer 38 to a desired thickness (preferably uniform) plus some excess thickness (at least 0.025 inch) to allow for subsequent machining of the seal.

An alternate nest step is to remove the filler from the abradable layer 38, to produce a seal having porosity. The next step is accordingly a heat treatment, in which the seal is heated to a temperature of about 525° F. for at least about 5 hours. The porosity of the resulting seal is a function of the filler content.

The abradable layer preferably includes in weight present between about 70–95, more preferably about 85–92 aluminum powder; and between about 1–25 weight percent filler material. The preferred proportion of metal powder to filler material is about 5 to 1, which provides an abradable layer having about 50 vol. % metal. Where no heat treatment is performed, the seal preferably has a hardness of about HR15Y 78–88. Heat treating the seal reduces the preferred hardness to about 60–70.

An advantage of the present invention is that the seal provides both acceptable durability and abradability, and also will not deflagrate during off-design operation during which significant amounts of seal material is ingested into the engine. In addition, the seal of the present invention is cost effective, and does not weigh any more than conventional seal materials. The seal of the present invention can be applied using conventional plasma spray apparatus, and the process of providing such a seal that enables adjustment of the proportion of metal and of filler, to provide an optimal seal adapted for different operating conditions. By co-spraying the metal and the filler, we produce a seal having a more uniform, finer microstructure relative to spraying blended of composite powders, which is a key to providing improved rub characteristics. The filler, methyl methacrylate, also produces more round pore morphology, which further enhances low wear, e.g., of the blade. Moreover, our testing has indicated that the seal of the present invention provides enhanced erosion resistance relative to conventional seals, i.e., the above mentioned Al-Si and polyester filler, without excessive blade wear penalty.

While the present invention has been described above in some detail, numerous variations and substitutions may be made without departing from the spirit of the invention or the scope of the following claims. Accordingly, it is to be understood that the invention has been described by way of illustration and not by limitation.

What is claimed is:

1. An air seal for use in a gas turbine engine having reduced susceptibility to deflagration during operating conditions in which an excessive amount of seal material is liberated from the seal, comprising:

a seal substrate;

a thermally sprayed metallic bond layer applied to at least a portion of the seal substrate, the bond layer composed of thermally sprayed nickel powder and aluminum powder; and an abradable seal layer applied to the bond layer, the abradable layer consists essentially of thermally sprayed aluminum powder and silicon powder forming a metal matrix, and co-deposited methyl methacrylate filler particles embedded in the metal matrix, wherein the filler particles are composed of a material with reduced ignitability relative to polyester particles.

2. The air seal of claim 1, wherein the air seal is outer air seal.

3. The air seal of claim 1, wherein the air seal is knife edge seal.

4. The air seal of claim 1, wherein the seal substrate is composed of a material selected from the group consisting essentially of titanium alloys, and nickel base, cobalt base and iron base superalloys and mixtures thereof.

5. The air seal of claim 1, wherein the thermal spray is plasma spraying.

6. The air seal of claim 1, wherein the aluminum powder and silicon powder particles are composed of between about 70–95 weight percent aluminum powder.

7. The air seal of claim 6, wherein the aluminum powder and silicon powder particles are composed of between about 85–92 weight percent aluminum powder.

8. The air seal of claim 1, wherein the abradable layer is composed of between 1–25 weight percent filler material.

9. The air seal of claim 1, wherein the proportion of metal to filler is about 5:1 by weight.

10. The air seal of claim 1, wherein the abradable layer is composed of at least about 50 vol. % metal.

11. The air seal of claim 1, wherein, of the powder for the metal layer, at least 99% of the powder particles by weight pass through a 140 mesh screen; at least about 93% by weight pass through a 170 mesh screen; and at least about 90% by weight are retained on a 325 mesh screen.

12. The air seal of claim 1, wherein, of the powder for the abradable layer, at least about 90% by weight pass through a 125 mesh screen, and at least about 65% by weight pass through a 63 mesh screen.

13. A gas turbine engine seal system comprising:

a seal assembly having a seal substrate; a metallic bond layer on the substrate and consisting of nickel and aluminum, and up to 1 weight percent each of iron, copper, zinc, manganese and magnesium; and a thermally sprayed abradable layer applied to bond layer, the abradable layer consisting of aluminum powder and silicon powder forming a metal matrix, and co-deposited methyl methacrylate particles embedded in the metal matrix; and an engine component adapted for motion relative to the seal assembly and having an abrasive portion interacting with the abradable seal material, the abrasive portion of the component and the abradable layer of the seal assembly cooperating to provide sealing.

14. The seal system of claim 13, wherein the aluminum powder and silicon powder particles are composed of between about 85–92 weight percent aluminum powder.

15. The seal system of claim 13, wherein, of the powder for the metal layer, at least 99% of the powder particles by weight pass through a 140 mesh screen; at least about 93% by weight pass through a 170 mesh screen; and at least about 90% by weight are retained on a 325 mesh screen.

16. The seal system of claim 13, wherein, of the powder for the abradable layer, at least about 90% by weight pass through a 125 mesh screen, and at least about 65% by weight pass through a 63 mesh screen.

17. A method of producing an air seal including a seal substrate for a gas turbine engine, the seal material being less likely to ignite under operating conditions in which an excessive amount of seal material is liberated from the seal and ingested into the engine, comprising the steps of:

providing a source of metal material for incorporation into the seal material, the metal material composed of silicon and aluminum;

providing a source of filler material, the filler material consisting of methyl methacrylate powder;

introducing the metal material into a thermal spray;

separately introducing the filler material into the thermal spray downstream of the metal material; and co-depositing the metal material and the filler material to form a seal layer on a substrate, the seal layer characterized by a matrix of aluminum and silicon with embedded methyl methacrylate particles, wherein seal material liberated from the seal during off-design engine operating conditions will not deflagrate in the engine.

18. The method of claim 17, wherein the step of providing a source of metal material provides metal material consisting of silicon and aluminum, and up to 1 weight percent each of iron, copper, zinc, manganese and magnesium.

19. The method of claim 17, wherein the step of providing a source of metal material provides powder, at least 99% of the powder particles by weight pass through a 140 mesh screen; at least about 93% by weight pass through a 170 mesh screen; and at least about 90% by weight are retained on a 325 mesh screen.

20. The method of claim 17, wherein the step of providing a source of filler material provides powder, at least about 90% by weight pass through a 125 mesh screen, and at least about 65% by weight pass through a 63 mesh screen.

21. The method of claim 17, wherein the thermal spray is plasma spray.

22. The method of claim 17, further comprising the step of heating the seal to at least about 525° F. for a sufficient time to thermally decompose at least some of the filler material and to generate a controlled amount of porosity in the seal material.

23. The method of claim 22, wherein the seal is characterized by a hardness of about HR15Y 60–70.

24. The method of claim 22, wherein the seal is characterized by about 50 vol. % metal.

25. The air seal of claim 1, wherein the metal layer has a thickness of between about 0.002–0.007 inches.

26. The air seal of claim 1, wherein the bond layer is composed of thermally sprayed nickel powder, chromium powder and aluminum powder.

27. The air seal of claim 26, wherein the bond layer is composed, by weight, of about 68.5 nickel, 18.5 chromium and 6 aluminum.

* * * * *